United States Patent [19]
Highberger

[11] Patent Number: 5,836,136
[45] Date of Patent: Nov. 17, 1998

[54] SEAL INTEGRITY MONITORING AND ADAPTIVE CONTROL METHOD AND APPARATUS

[75] Inventor: Gary G. Highberger, Atlanta, Ga.

[73] Assignee: Kliklok Corporation, Decatur, Ga.

[21] Appl. No.: 819,895

[22] Filed: Mar. 18, 1997

[51] Int. Cl.⁶ ............................ B65B 51/30; B65B 57/02
[52] U.S. Cl. .................... 53/75; 53/55; 53/507; 53/551; 53/477
[58] Field of Search ................... 53/75, 76, 52, 53/55, 507, 508, 477, 451, 551

[56] References Cited

U.S. PATENT DOCUMENTS

| | | | |
|---|---|---|---|
| 4,418,771 | 12/1983 | Henry et al. ............................ | 177/1 |
| 4,511,044 | 4/1985 | Connor et al. ......................... | 209/522 |
| 4,538,692 | 9/1985 | Henry et al. ............................ | 177/1 |
| 4,546,596 | 10/1985 | Cherney ............................... | 53/75 X |
| 4,768,327 | 9/1988 | Mosher ................................ | 53/75 X |
| 4,923,558 | 5/1990 | Ellenberger et al. .................. | 156/499 |
| 4,996,825 | 3/1991 | Bacon et al. ........................... | 53/451 |
| 5,110,381 | 5/1992 | Heckard et al. ....................... | 156/64 |
| 5,117,612 | 6/1992 | Keim et al. ............................ | 53/451 |
| 5,147,491 | 9/1992 | Thomas et al. ....................... | 53/75 X |
| 5,289,671 | 3/1994 | Lerner et al. .......................... | 53/75 X |
| 5,439,539 | 8/1995 | McLean ................................ | 156/64 |
| 5,533,322 | 7/1996 | Bacon et al. ........................... | 53/451 |
| 5,540,035 | 7/1996 | Plahm et al. .......................... | 53/451 |
| 5,551,206 | 9/1996 | Fukuda ................................. | 53/75 |

*Primary Examiner*—James F. Coan
*Attorney, Agent, or Firm*—King and Schickli

[57] ABSTRACT

The integrity of a seal in packaging film is monitored during packaging of loose, free flowing product and adaptive control of the packaging method/apparatus is provided in response to the determination made. The pressure being exerted between the sealing jaws upon reaching a closed position and the seal being formed is monitored and analyzed to evaluate the seal integrity in a dedicated microprocessor. An adaptive, real time signal is provided to a CPU/controller to adjust the relative product flow and packaging film movement.

15 Claims, 4 Drawing Sheets

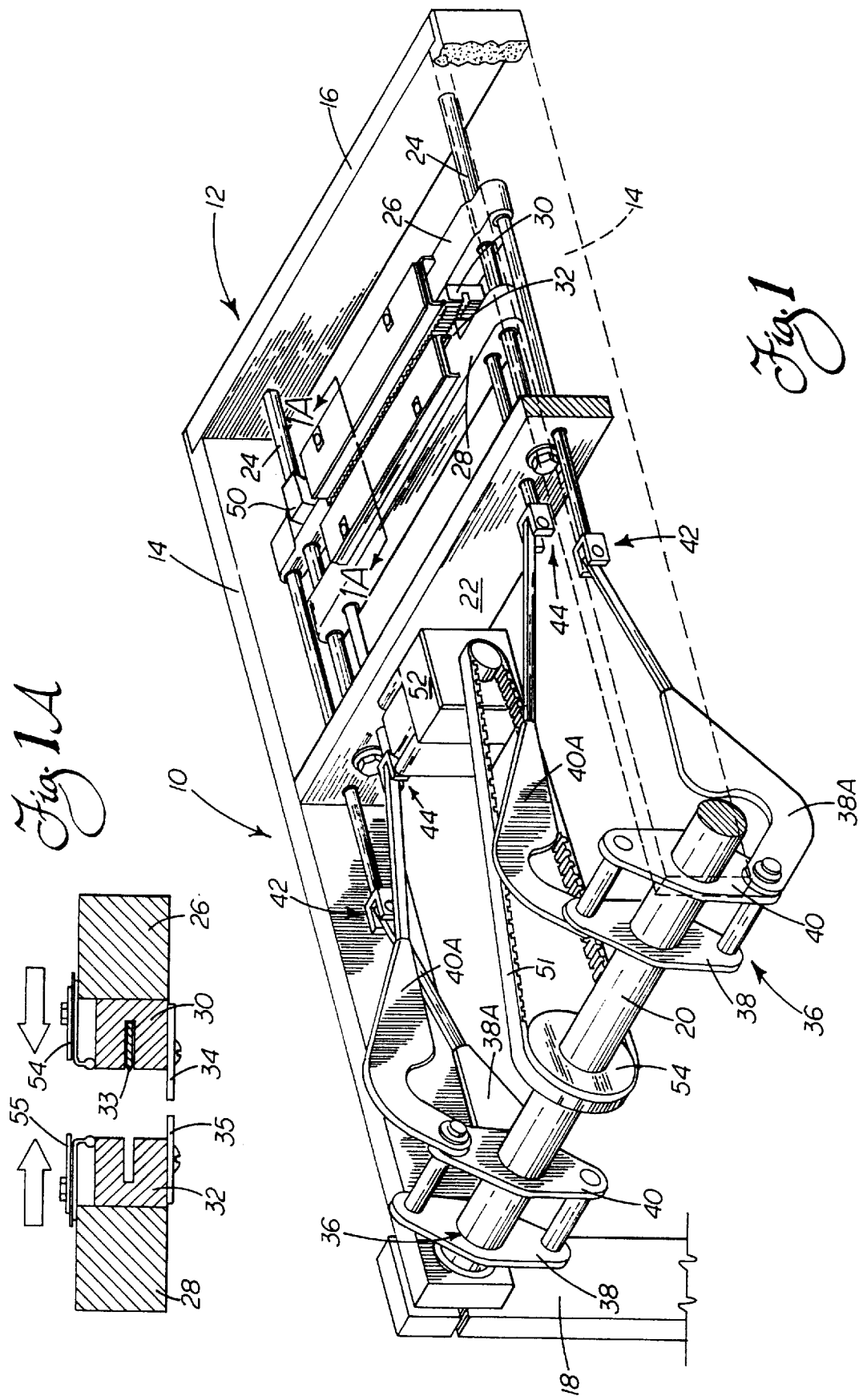

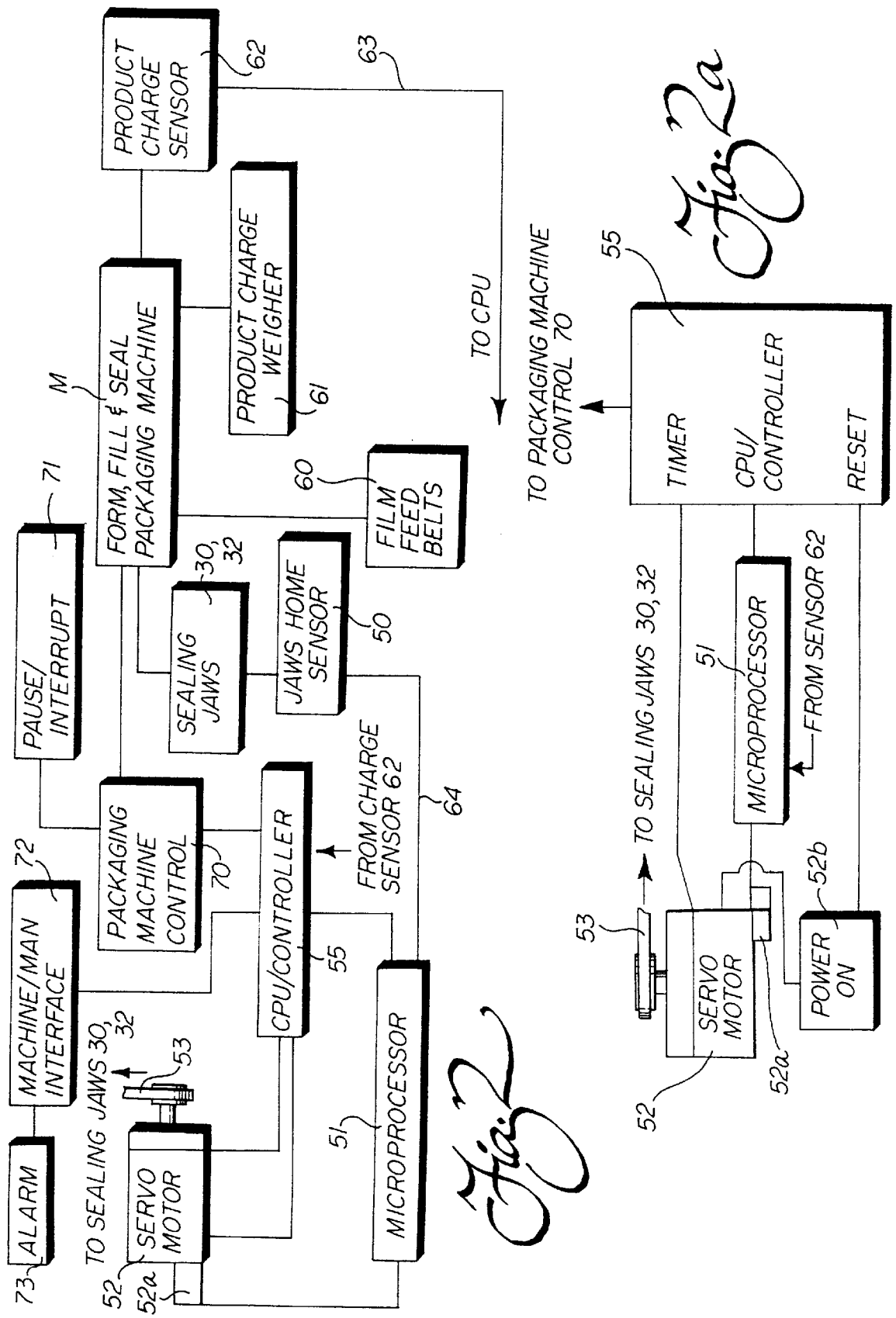

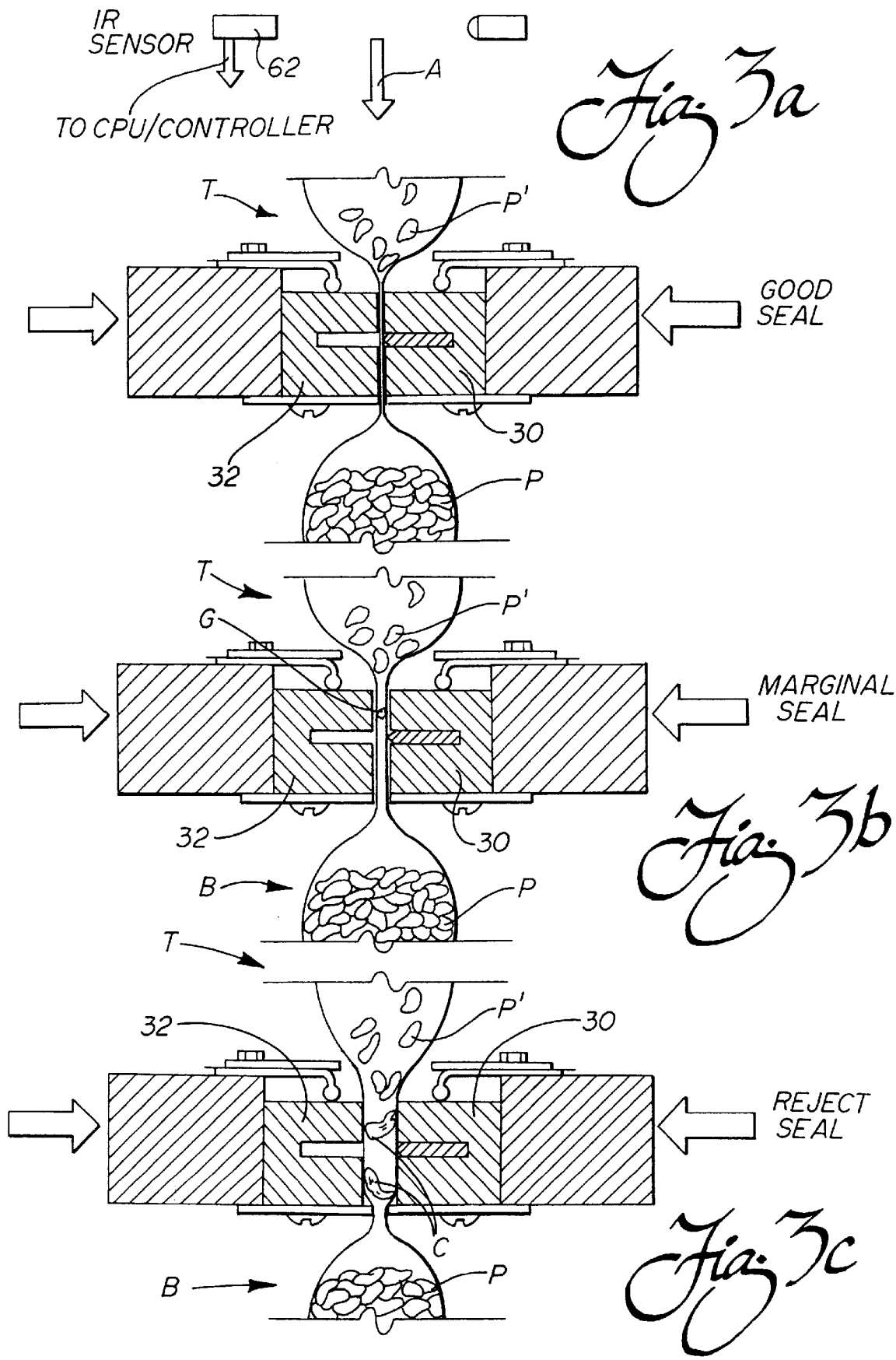

SEAL INTEGRITY MONITORING AND ADAPTIVE CONTROL METHOD AND APPARATUS

TECHNICAL FIELD

The present invention relates to the field of form, fill and seal packaging systems, and more particularly to monitoring, analysis and control of seal integrity in a continuous vertical form, fill and seal packaging method/machine and including integrated computer control with adaptive feed back.

BACKGROUND OF THE INVENTION

Over the past several decades, many advances have been made in improving the overall speed, efficiency and reliability of machines and related methods for forming, filling and sealing of packages made from a continuous film. These machines typically comprise a supply of packaging film in the form of a web, a former for converting the web of film into a continuous hollow tube and reciprocating jaws for stripping, sealing and cutting the tube into consecutive series of filled packages, sometimes referred to as pillow-shaped bags. One of the most successful approaches for stripping/sealing comprises reciprocating stripping/sealing jaws mounted on a carriage that is driven for movement in the direction of bag forming. This movement is very effective in stripping late falling product and transient crumbs from the end seal area prior to sealing the package. This approach is very effective in reducing the occurrence of end seal contamination and allowing the packaging machine to operate with greater efficiency.

In recent years, there have been additional substantial advancements made in the speed and efficiency of the form, fill and seal packaging machine and method. One such advancement is the utilization of computerized combination weighing wherein multiple product portions are sampled and combined to make one product charge. This advancement has proven very successful in reducing product give away, in addition to speeding up the overall packaging process. A leading approach in computerized weighing is set forth in the circuit described and claimed in U.S. Pat. Nos. 4,418,771 entitled "Method and Apparatus for Combination Weighing" and 4,538,692, entitled "Method and Apparatus for Combination Weighing With Multiple Storage Cups for Each Scale Hopper" owned by the present assignee.

Furthermore, substantial progress has been made in controlling the apparatus for actually forming the bag with advanced computer control. In one such advancement, a computer control system is provided wherein a central processing unit (CPU), including at least a 4-axis coordinator, operates the package forming apparatus in a very efficient manner. Specifically, the combination weigher, the film feeder/seamer, the vibrating clamp for settling the product, and the moving carriage/stripper/sealing jaws are all synchronized in response to the critical parameters of the packaging operation. In other words, this control routine monitors and coordinates all of the various components and their patterns of movement, so that maximum operating speeds in excess of 140 bags/minute, and even approaching 200 bags/minute, are attainable. This advanced system is described and claimed in U.S. Pat. No. 5,533,322 entitled "Continuous Vertical Form-Fill-Seal Packaging Machine With Constant Motion Carriage" assigned to the present applicant, and U.S. Pat. No. 5,540,035 entitled "Continuous Vertical Form, Fill and Seal Packaging Machine With Synchronized Product Clamp", also assigned to the present assignee.

In terms of increased speed and overall operational accuracy, the advancements in the '322 and '035 patents are proven to be very successful. The timing and interaction of the various components of the package forming apparatus and the weigher is such so as to allow several product charges to be in transition from the weigher to the package forming apparatus at one time. This action is effective to eliminate dead time where one component waits on another, to thereby allow increased speed of operation. The various components for feeding/vertically seaming the film, clamping the film and settling the product and forming the transverse seal carry out the process in an optimum manner. No longer is the packaging machine set up in such a manner as to match the worst case scenario of these various components. For a complete and full description and understanding of this area of the overall packaging system, reference should be made to these patents.

Besides the improvements in the control circuitry, some additional improvements have been made in other sections of the packaging machines, such as set forth in U.S. Provisional patent application Ser. No. 60/000,750 now PCT patent application Ser. No. PCT/US96/10946, filed Jun. 26, 1996 and entitled "Improved Transitional Product Flow and Adaptive Control". In this particular earlier development, the transitional flow of the charges of product is monitored, both as to position or gap between charges, along the flow path between the weigher and the bag forming station. As a result of adaptive control, the stringout or lag of individual charges can be minimized to allow even more operational speed. It is with regard to this earlier improvement that the present invention of seal integrity monitoring and control is most closely related. Indeed, as will be seen, the present invention can be advantageously used in tandem with this earlier concept.

Attaining such high operating speeds, as described above, necessarily tends to reduce the gap between product charges in the packaging process creating a higher incidence of product charge matter caught in the end seal during the sealing operation. When this happens and a faulty seal is formed, it does of course result in a bag being rejected, thereby lowering the overall operating efficiency. This tendency for a higher incidence of product charge matter in the end seal, due primarily to the now attainable high packaging speeds, provides the additional impetus of the present invention. By attacking and solving the contaminated seal problem, the overall efficiency of the packaging process is still further increased to reach the next level of operational productivity in the form, fill and seal packaging operation.

There already exists a method of monitoring packaging film seal pressure, as described in U.S. Pat. No. 5,439,539 to McLean. The '539 patent discloses a simulated method of heat-sealing films using a pair of sealing jaws, sensing the clamping pressure of the jaws with a load cell and adjusting the clamping pressure throughout the individual sealing operations. The pressure is sensed by the load cell when the precise angular position of a shaft which drives the sealing jaws is at a bottom dead center position. This pressure is compared to a preselected pressure and the angular position of the shaft is adjusted. Although the '539 patent describes sensing, monitoring and controlling the pressure between a pair of sealing jaws, there is no method of analyzing the sensed/monitored pressure to evaluate the presence or absence of product charge matter affecting the seal integrity, or of adaptively controlling any aspect of the packaging machine beyond the sealing jaws.

Thus, an important aspect of the present invention is to provide a seal integrity monitoring method/apparatus to evaluate and adaptively control the steps/components of the packaging operation for optimum performance while minimizing seal contamination. As a result, it is now possible to overcome the cited limitations of the prior art, through advanced adaptive control of the overall packaging operation. This is especially true when operating in tandem with the concepts set forth in the above mentioned, commonly owned patents, and in particular the '946 PCT case. To put it another way, the goal is maximizing efficiency through maintaining the highest possible speed of the packaging system in combination with reducing the incidence of seal contamination to a neglible level.

SUMMARY OF THE INVENTION

Accordingly, it is a primary object of the present invention to provide a method and apparatus for overcoming the limitations of the prior art, and to provide advanced seal integrity monitoring and adaptive control relating to packaging methods and machines.

It is another object of the present invention to provide a method for sealing packaging film and monitoring seal integrity to bring about overall increased efficiency of packaging methods/machines.

It is still another object of the present invention to provide improved methods and apparatus for sealing/monitoring seal integrity and adaptively controlling packaging steps/components to attain maximum speeds and minimum seal contamination, thereby increasing the efficiency of the packaging operation.

Still another object of the present invention is to provide an improved method/apparatus for monitoring seal integrity wherein the sealing jaw engagement pressure is monitored by sensing the torque of the operating servo motor, comparing the monitored pressure/torque to a calculated or learned design threshold, and adaptively adjusting the relative product flow/film feed rate so as to increase the packaging speed and attain an optimum packaging operation.

It is a related object of the present invention to provide a method/apparatus for monitoring the presence or absence of product charge matter affecting seal integrity to bring about improvements for increasing overall efficiency and packaging speed, and in turn establishing substantially full predictability of the packaging operation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, there is provided an improved seal integrity monitoring and control circuit in a packaging machine or the like, for adaptive control of the overall film feeding and packaging method to assure maximum efficiency at the highest packaging speed. In particular, the method is concerned with monitoring seal integrity and adaptively controlling packaging speeds of substantially loose, free flowing product.

Preferably to do this, the pressure exerted between sealing jaws is monitored and analyzed to evaluate the presence or absence of the charge matter that may have lagged behind along the product flow path. Dependent upon the result of the pressure analysis, an input signal is generated and sent to the packaging machine controller or CPU. As a result of this signal and other operating parameters, the controller either increases, decreases or maintains the present packaging speed. This adaptive control allows the efficiency and overall packaging speed of the packaging machine to be maximized independent of ambient conditions and product variations that tend to cause the deleterious product charge lag or stringout.

In carrying out the inventive method, it is desirable to add the step of sensing the relative position of the sealing jaws prior to monitoring and analyzing the pressure. In other words, it is when the sealing jaws attain the closed position that the pressure being exerted between the jaws is monitored and analyzed to evaluate the presence or absence of charge matter affecting seal integrity.

In accordance with another aspect of the present invention, the step of monitoring and analyzing the pressure is performed by a dedicated microprocessor that is connected to the packaging machine CPU/controller. The sealing pressure, or more precisely the motor torque requirement, is analyzed each time the sealing jaws reach the closed position to determine whether a good seal, a marginal seal, or a reject seal is formed. These levels of seal integrity are based on the presence or absence, as well as the amount of product charge matter caught in the seal. Depending upon this analysis, the step of providing an input signal to the controller is performed.

The method of sealing/monitoring the seal of the packaging film further includes the step of initially establishing or calculating a design torque threshold. This calculation is performed by simply operating the packaging machine through a predetermined number of cycles while forming perfect seals during which the average of the torque is determined by the CPU/controller. In accordance with the preferred operation, this running average of the torque is then increased by a small fixed percentage in order to provide the threshold against which the forming of each seal is gauged.

In practicing the method, the analyzing step is performed by comparing the input torque signal of the servo motor to the design torque threshold that has been so calculated. If upon performing the comparison, the sensed torque is within a first range that is less than the design torque threshold, then a good seal signal is known to be generated and the CPU/controller is provided with a command to continue machine operation, as is. In practice, it has been found that any seal with charge matter below 1 millimeter is best defined as providing a good seal. In the event that 1–3 millimeters of product charge is trapped in the seal, then the CPU/controller provides a marginal seal signal. In other words, in the range of 1–3 millimeters of charge matter, an increased first range over the design torque threshold is indicated. In this case, the CPU/controller again provides the indication to continue machine operation.

It has been found that making such a marginal seal for one or two times during the packaging operation is acceptable, and thus this is the reason that no slow down of the packaging film is required immediately. However, in accordance with the preferred procedure, in the event that a marginal seal is made for three consecutive times, the CPU/controller is signaled to activate a pause in the machine operation. Through a machine/man interface, an alarm is made and the operator then makes the choice of correcting the situation, usually by reducing the film speed.

In the event that the speed of the film feed has substantially overrun the product flow and the stringout of the tail end of a product charge causes more of the product to be caught between the sealing jaws, that is, where the amount of trapped product charge is in the range of 3–6 millimeters and above, then the sensed torque of the servo motor operating the sealing jaws is elevated to be in a second range greater than the design torque threshold. In this instance, a reject seal is made and the CPU/controller activates an interrupt condition and the machine is stopped. As broadly anticipated, the torque to be sensed in the first range is set at approximately 3% above the design torque threshold, and the torque to be sensed in the second range is approximately 6% above the design torque threshold.

With regard to the broadest aspects of the present invention, the step of sensing the relative position of the sealing jaws before the sealing pressure is analyzed may be performed through a load cell, radiant energy device, magnostrictive device or an equivalent sensor. In any case, this sensor generates a pulse signal which is received by the dedicated microprocessor each time the sealing jaws reach the full sealing position. Furthermore, broadly speaking one of these types of sensors, or other equivalent devices, can be used in lieu of the preferred torque transducer connected to the servo motor that drives the sealing jaws. As of the date of filing of this application, sensing the torque of the servo motor is however the preferred embodiment and gives the best overall results.

The utilization of the CPU/controller that receives an input signal from the torque transducer/microprocessor that is dedicated to sense the servo motor torque allows the control circuit of the present invention to adaptively vary the speed of the packaging method/machine. This is done in order to maximize the overall packaging efficiency while maintaining the highest possible speed of the packaging system. For example, in the event that the CPU/controller senses a long string of packaging cycles where the torque being sensed is consistently less than the design torque threshold so that all of the seals being made are good seals, then a signal is provided through the dedicated microprocessor to the CPU/controller to speed up the packaging film feed. On the other hand, as mentioned briefly above, if marginal seals are made in a string, such as for three consecutive times as a preferred number, then the machine is caused to pause, the alarm is sounded and an operator intervenes through the machine/man interface in order to make adjustments.

In accordance with another aspect of the invention, this correction to ramp down the speed of the film can also be carried out automatically by the CPU/controller. Furthermore, in particular with reference to the '946 PCT application of applicant, at least one product charge sensor can be provided along the product flow path. The input from this sensor is then compared to a defined time target, and if the charge is lagging behind on successive cycles, the dedicated microprocessor uses this information to further adjust the relative product flow with respect to the operating speed of the film.

Still other objects of the present invention will become apparent to those skilled in this art from the following description wherein there is shown and described the preferred embodiments of this invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serves to explain the principles of the invention. In the drawings:

FIG. 1 is a perspective view of the reciprocating carriage with combined blousing, stripping and sealing apparatus and operating servo motor of the present invention, one side rail of the carriage being broken away and shown in phantom for clarity;

FIG. 1A is a cross-sectional view taken along the line 1A—1A in FIG. 1 and illustrating the sealing jaws, cut-off knife and the attached stripper plates and blousing plates;

FIG. 2 is a schematic block diagram showing the control circuit for the seal integrity monitoring/adaptive control apparatus of the present invention within the overall packaging machine schematic diagram;

FIG. 2A is a schematic diagram of a subsection of the control circuit of FIG. 2 illustrating the dedicated torque transducer/microprocessor in combination with the CPU/controller that accomplishes the basic sealing and monitoring method of the present invention;

FIG. 3A is an illustration showing the sealing jaws forming a good seal;

FIG. 3B is an illustration showing the sealing jaws forming a marginal seal with minimum charge product caught between the jaws in the seal area;

FIG. 3C is an illustration showing the sealing jaws with more product contaminating the seal area, thus forming a reject or obstructed seal.

Figure 4:
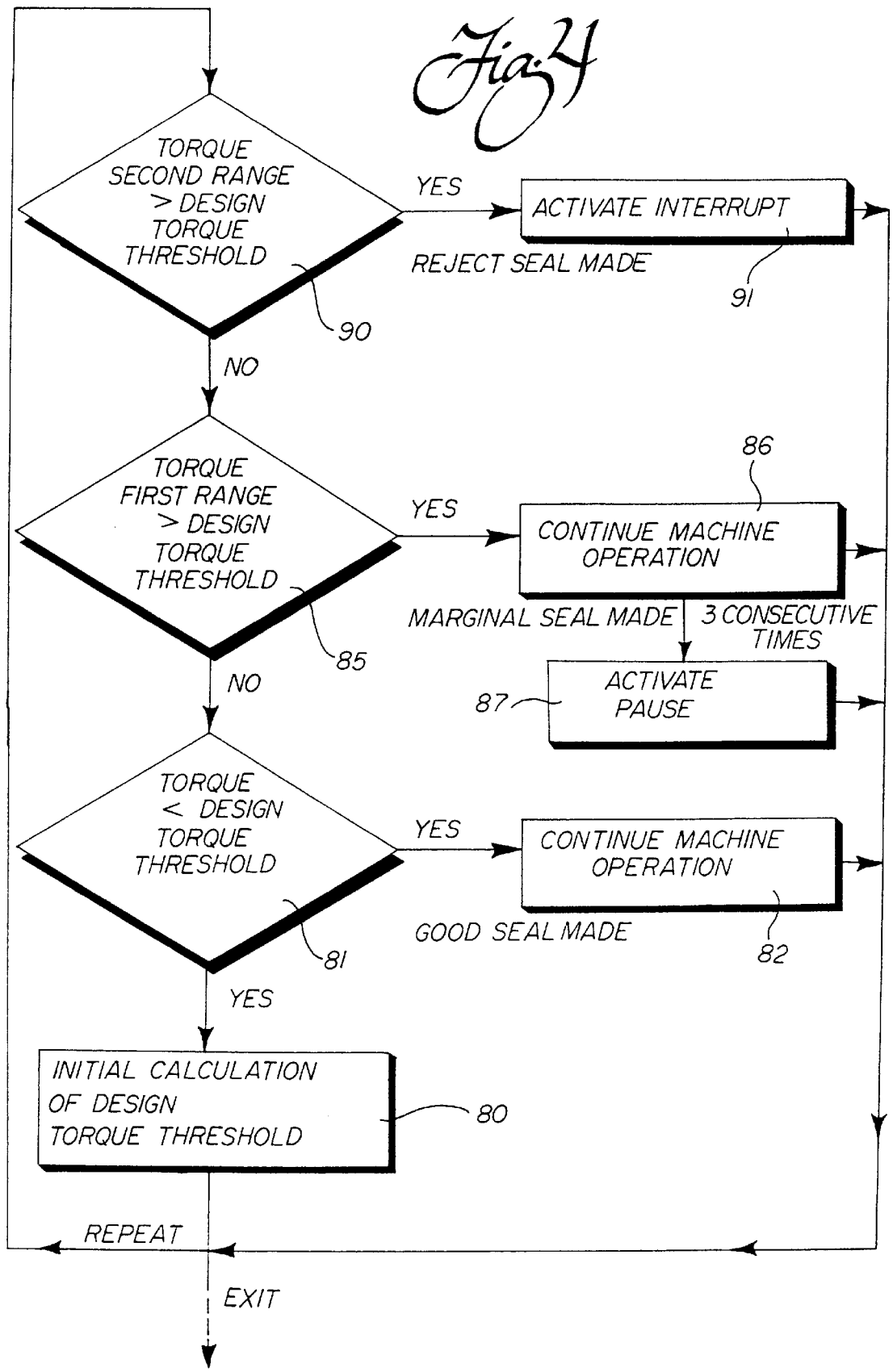
FIG. 4 is a flow chart diagram illustrating the analysis and resulting control signals directed by the firmware within the dedicated microprocessor of the present invention.

Reference will now be made in detail to the present preferred embodiments of the invention, an example of which is illustrated in the accompanying drawings.

DETAILED DESCRIPTION OF THE PREFERRED EMBODIMENT

With reference to the perspective view of FIG. 1, there is shown a preferred embodiment of the bag forming carriage with a stripper, blousing and sealing apparatus 10 for use in a form, fill and seal packaging method/machine. As best illustrated in FIGS. 3A–3C, a product P is packaged in a bag B formed from a continuous film tube T. For purposes of illustration, it will be assumed that the product P is potato chips, which inherently includes crumbs, salt particles, dust and the like; however, it is to be understood that packaging other loose, free flowing product, including other foods, is contemplated.

The carriage, generally designated by the reference numeral 12, includes a pair of side rails 14 and a front cross rail 16. A support frame 18 forms a part of the packaging machine and receives an oscillating drive shaft 20. The carriage 12 oscillates up and down along the tube T. This is more fully explained in the issued U.S. Pat. No. 4,996,825, which is hereby incorporated by reference. In order to allow the oscillating movement of the carriage 12 to occur at the same time, it is clear that the shaft 20 is journaled for rotation in the support frame 18, and the carriage 12 is journaled for separate rotation.

At the forward end of the carriage 12 fixedly positioned between the front cross rail 16 and intermediate cross piece 22 are mounted two guide rods 24. Supported for sliding motion along the guide rods 24 are a pair of support blocks 26, 28 that carry sealing jaws 30, 32 respectively. As best shown in FIG. 1A, one of the sealing jaws 30 includes a cut-off knife 33 operable in a known fashion to cut and release each formed bag B in the proper timed sequence. Mounted below the two sealing jaws 30, 32 are slidable stripper plates 34, 35. These stripper plates are spring loaded to their extended position (see FIG. 1A) in a manner well known in the art. In the extended position shown in FIG. 1A, the plates are in a position to fully engage the film tube T (not shown in this figure) and strip the product from the seal area prior to the final movement of the sealing jaws 30, 32 together for sealing (see FIGS. 3A–3C).

Mounted on the oscillating drive shaft 20 are a pair of bell crank assemblies 36. Each of the assemblies includes two bell cranks 38, 40 and pivotally attached to each of the bell cranks is a corresponding drive arm 38a, 40a. Attached to each of the outside drive arms 38a is a drive linkage, generally designated by the reference numeral 42. Similarly, attached to each of the inside drive arms 40a is a drive linkage 44. The drive linkages 42, 44 are operative to move the sealing jaw support blocks 26, 28 toward and away from each other to form the stripping/sealing operation. This is more fully explained in the issued U.S. Pat. No. 4,751,808, which is hereby incorporated by reference.

A pair of blousing plates 46, 48 can be mounted on top of the sealing jaws 30, 32, as shown in FIG. 1A. As illustrated, these plates are spaced from the sealing jaws 30, 32 in order to remain substantially insulated therefrom. The air circulating under the plates 46, 48 keeps them relatively cool to allow engagement with the bottom of each formed bag. Unlike the stripper plates 34, 35, the blousing plates 46, 48 are not spring loaded and are positioned so as to be slightly spaced from each other to accommodate the thickness of the packaging tube without tightly engaging the same.

In one important aspect of the present invention a jaws home sensor 50 (see FIGS. 1 and 2) is provided to sense the relative position of the sealing jaws 30, 32. The sensor 50 generates a pulse signal each time the sealing jaws 30, 32 reach a closed/sealing position in readiness to form the seal in the tube T. The signal is optically isolated and received by a dedicated microprocessor 51 (see FIG. 2). The pulse signal operates as a trigger to perform the real time analysis firmware program embedded in the microprocessor 51 (see FIG. 4). This analysis program of the microprocessor 51 is discussed in greater detail below.

As seen in FIG. 1, the oscillating drive shaft 20 is driven by an AC/DC brushless servo motor 52. The output shaft of the motor 52 engages a drive belt 53 that in turn operates a matching pulley 54 on the drive shaft 20. As shown in block diagram in FIG. 2, the servo motor 52 is controlled by CPU/controller 55 with adaptive feed back from the microprocessor 51.

In accordance with another important aspect of the present invention, the pressure exerted between the sealing jaws 30, 32 during forming of the transverse end seal of the bag B is monitored and analyzed as a function of the servo motor torque. The servo motor 52 through torque transducer 52a provides proportional input signals for modifying the operation of the packaging system through the microprocessor 51. Prior to the microprocessor 51 receiving the torque signal, the signal may be conditioned by a 100 hertz single pole filter (not shown) and may be digitized if desired. In the preferred embodiment, the microprocessor 51 is a PIC 16C71A single chip microcontroller.

As best illustrated in FIG. 2, the sealing jaws 30, 32 are a part of a form, fill and seal packaging machine M, which also includes the appropriate film feed belts 60, a product charge weigher 61 and a product charge sensor 62 positioned along the product charge flow path at a preselected distance above the sealing jaws 30, 32, as fully described in the '946 PCT application. The sensor 62 provides a signal through line 63 to the CPU/controller 55 where it is compared to a defined time target for modifying the adaptive control provided by the microprocessor 51. The jaws home sensor 50 senses the closed position of the sealing jaws 30, 32 in order to trigger the operation of the microprocessor 51 through line 64, to thus provide the input signal to the CPU/controller 55. As shown in FIG. 2A, the servo motor 52 is operated by an imbedded timer that determines the dwell period of the sealing jaws 30, 32 in the closed position. After each sealing operation, the CPU/controller resets the motor 52 through a power-on module 52b.

The CPU/controller 55 controls the packaging machine M through a standard packaging machine control 70, which is operative to initiate all of the usual operating functions. A pause/interrupt operator unit 71, and a machine/man interface 72 are connected to the CPU/controller 52. An alarm 73 is provided to alert the human operator when manual intervention is necessary.

During operation, the microprocessor 51 receives the torque signal from the torque transducer 52a when the sealing jaws 30, 32 reach a closed position and a seal is formed. This monitored pressure is then analyzed to evaluate the seal integrity in accordance with any one of the three conditions shown in FIGS. 3A, 3B, 3C, or variations thereof. Depending on the condition of the seal, an input signal is provided to the CPU/controller 55 and a control signal is generated to provide adaptive control of the packaging system, such as through the packaging machine control 70. As a result, the packaging speed and the efficiency can be maximized independent of the ambient conditions that exist and/or product variations that may have affected the film feed through the belts 60 and/or the transitional product flow.

With specific reference now to FIGS. 3A–3C, three representative conditions that are commonly encountered in the packaging operation of the present invention are illustrated. In this preferred embodiment illustrated, it is assumed that the product P being packaged is potato chips; the product P being fed as a composite charge from the weigher 61 along a typical transitional flow path, as indicated by the flow arrow A in FIG. 3A. In this instance, a good seal has been formed and the next in-line charge of product P' is being positioned above the sealing jaws 30, 32. It can be assumed that the product is passing the sensor 62 and that the signal sensing the final lagging product piece is sent through the line 63 to the CPU/controller 55. As illustrated, in this ideal situation, there are no crumbs, salt grains or chips caught in the seal area so that a good seal is formed in this instance.

However, in the instance where the next-in-line product charge P' has not kept up with the speed of the packaging film forming the tube T, and the strippers 34, 35 have missed completely clearing the seal area, then as illustrated in FIG. 3B, a grain G of salt, a small crumb or the like, is caught and contaminates the seal. Since the jaws 30, 32 cannot fully close in response to the driving movement by the servo motor 52, the torque being sensed by the transducer 52a is elevated. The dedicated microprocessor 51 through its firmware routine elects to either continue the machine operation, or to activate a pause, as will be explained further in detail below. In any case, a single marginal seal is acceptable by definition and there is no loss of product filled bags in this instance.

With reference to FIG. 3C, a condition is represented where the speed of the film tube T has substantially overrun the transitional product flow so that lagging or trailing chips and/or crumbs C from the product charge P are trapped between the sealing jaws 30, 32. At this point, the next-in-line product charge P' is ready to form the next bag and is likely to contribute additional product charge matter between the jaws 30, 32 through the gap formed. In such an instance, it will be realized that a reject seal is formed. In particular, the spacing caused by the trapped product charge matter is greater than before, and thus the torque of the servo motor 52 is raised to an even higher level. To put it another way, the trapped charge matter (broken chips/crumbs/salt grains) keeps the jaws 30, 32 from fully closing to the pre-set extent, thus raising the torque of the motor 52. Accordingly, in response to the elevated torque sensed from the torque transducer 52a, the microprocessor 51 provides a signal to the CPU/controller 55 to activate the interrupt operator unit 71 of the system. In this instance, a manual adjustment of the relative transitional product flow and film movement in the overall packaging operation is made by the human operator, and at least the one or two faulty bags are removed, before the system is once again placed in operation. It will be understood, that the showing of the spacing of the contaminated seal area in FIGS. 3B and 3C is exaggerated for illustrative purposes.

With reference now to FIG. 4, the firmware routine of the dedicated microprocessor 51 can be more fully described. When the packaging system, such as the packaging machine M, is first started during a packaging work shift, a preselected number of cycles, (such as ten cycles) is run to provide an initial calculation fixing the design torque threshold of the system, as indicated by block 80. In the preferred embodiment illustrated where potato chips are being packaged, it has been found that a torque threshold representing a 1 millimeter trapped charge matter, such as the salt grain G of FIG. 3B, can be assumed as the least size to be significant. Below this thickness, any product dust or the like has no recognizable effect on the integrity of a seal being formed, and is thus ignored. Thus, a torque calculation is made as an average over the preselected number of predetermined good seal cycles. If desired, this torque level may be calculated through operation of dry cycles of the packaging machine, that is, without product being packaged.

Represented above the torque threshold calculation block 80 is block 81 representing a torque sensed that is less than the design torque threshold, in which case a good seal is made. The routine provides for the machine to continue operation through block 82. In this instance, as the cycle is completed the firmware routine automatically repeats for the next cycle, as indicated.

The block 85 indicates a reading received by the microprocessor 51 of a torque generated in the servo motor 52 representing a first range greater than the design torque threshold. In this instance, the salt grain and/or crumb G contaminating the seal area, as illustrated in FIG. 3B, can be considered for illustrative purposes, in a range from 1–3 millimeters in thickness. The increased torque is approximately 3% above the design torque threshold. Such product matter caught in the seal area is still sufficiently insignificant to justify immediate discontinuation of the machine operation, and a continue machine operation command is generated, as indicated in block 86. Again, the routine automatically repeats for the next packaging cycle.

In accordance with a more specific aspect of the present invention, in the event that such marginal seals (1–3 millimeters thickness contamination) are made for three consecutive times, the routine is now changed by the pre-programming of the microprocessor 51 to activate a pause through the pause/interrupt operator unit 71, as signified by the block 87 in the routine. The machine/man interface 72 is addressed, and the alarm 73 is activated so that the human operator can take the desired corrective action to once again place the packaging system back in full operation.

Alternatively, when a pause occurs due to the accumulation of consecutive marginal seals being made, the microprocessor 51 can provide an input signal that automatically makes an adjustment. As mentioned above, the change is usually to slow the film speed to eliminate the overrunning condition of the film tube T with respect to the product flow in the transitional area. This automatic adjustment allows a return immediately to the optimum speed and efficiency of the packaging system. Again, this condition where change is needed occurs most often during a work shift when the humidity changes and/or the product conditions, such as density, are modified. A usual situation is where the humidity is reduced and the feed belts 60 are allowed to grip better and/or the product density/weight, or product build-up in the system is increased.

In the instance where a reject seal is formed, as explained with regard to FIG. 3C, the torque of the servo motor 52 sensed through the transducer 52a is in a second range of approximately 6% greater than the design torque threshold. This elevated torque level is thus in a range doubled in terms of the percentage above the design torque threshold over that of the first range. Thus, as representatively shown in block 90, the trapping of whole chips C, or other substantial clumps of charge product, such as to be 3–6 millimeters in thickness and above, causes the microprocessor 51 to recognize in real time that a reject seal is being made. Then through block 91, the routine initiates an interrupt condition to activate the pause/interrupt operator unit 71. Under this condition, 1–2 bags, or possibly more, must be sacrificed, and preferably the operator through the machine/man interface 72 resets the packaging system for continuing operation. At the same time, manual or automatic adjustment of the relationship of the product flow to the packaging film tube movement is inputted to prevent the overrunning condition that has caused the product charge matter to be caught in the seal area.

From the above, it will now be realized that substantial results and advantages are obtained by the method and corresponding apparatus for sealing and monitoring the integrity of a seal in the form, fill and seal packaging operation. The pressure being exerted between the sealing jaws 30, 32 is sensed through the torque transducer 52a of the servo motor 52 that drives the sealing jaws into the sealing position. By analyzing the torque, the pressure being applied is determined, and this in turn is proportional to the seal integrity. The dedicated microprocessor 51 provides an input signal to the CPU/controller 55 and a control signal through the packaging machine control 70 is operative to initiate adaptive control of the packaging system, either through a human operator or automatically.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A method for sealing and monitoring the integrity of a seal in packaging film during forming by opposed sealing jaws during packaging of loose, free flowing product or the like, and for adaptive control thereof, comprising the steps of:

monitoring a pressure being exerted between said sealing jaws when said sealing jaws reach a closed position and a seal is formed;

analyzing said pressure to evaluate the seal integrity;

providing a good seal signal to a controller when the pressure is less than a design threshold;

providing a marginal seal signal to said controller when the pressure is within a first range above the design threshold but indicative of an acceptable seal; and providing a reject seal signal to said controller when the pressure is within a second range above said first range and indicative of an unacceptable seal; and generating a control signal by said controller to provide adaptive control of said packaging, whereby the packaging speed and efficiency can be maximized independent of ambient conditions and product variations.

2. The method of sealing and monitoring the seal during packaging according to claim 1, wherein during formation of the seal, the additional steps are provided:

actuating a servo motor coupled to said sealing jaws;

moving said sealing jaws in a first direction toward the closed position so as to form the seal; and sensing the relative position of said sealing jaws before sealing pressure is analyzed.

3. The method of sealing and monitoring the seal of claim 2, wherein the torque of said servo motor is monitored and is indicative of the pressure being exerted between said sealing jaws.

4. The method of sealing and monitoring the seal of claim 3, wherein the step of analyzing the pressure to evaluate seal integrity includes analyzing the torque of said servo motor each time said sealing jaws reach the closed position.

5. The method of sealing and monitoring the seal of claim 1, wherein said design threshold is learned and said first and second ranges are provided by the steps of:

calculating an average pressure over a predetermined period of successive good sealing cycles to generate the design threshold;

adding fixed percentages to said average pressure to establish said first and said second ranges during the packaging process in order to maximize the speed and efficiency of the packaging operation.

6. The method of sealing and monitoring the seal of claim 5, wherein the step of calculating an average pressure over a predetermined period of successive good sealing cycles to generate the design threshold further includes the step of:

updating said average pressure after successive sealing operations, whereby said design threshold and said first and second ranges are continuously adapted.

7. The method of sealing and monitoring the seal of claim 1, wherein the step of generating a control signal to provide adaptive control of said packaging operation further includes the steps of:

continuing the operation of said packaging machine upon receiving said good seal signal; and reducing the speed of said packaging machine upon receiving at least two consecutive marginal seal signals.

8. The method of sealing and monitoring the seal of claim 1, wherein during adaptive control there is provided the additional steps of:

moving said film along a longitudinal path;

providing a substantially loose, free flowing charge of product to be packaged;

feeding the product charge along a defined parallel flow path relative to said film;

determining the presence or absence of matter from said charge in a seal being formed in response to the input signal; and adjusting at least one operating step of the film moving and feeding steps in accordance with the determination of charge matter in the seal, whereby through adjustment of the relative transitional product flow and film movement the overall packaging operation in terms of speed and efficiency can be maximized.

9. The method of sealing and monitoring the seal of claim 7, wherein the step of generating a control signal to provide adaptive control of said packaging operation further includes the step of interrupting said packaging operation upon receiving said reject seal signal.

10. The method of sealing and monitoring the seal of claim 7, wherein the step of continuing the operation of said packaging machine upon receiving said good seal signal further includes the step of:

increasing the speed of said packaging machine upon receiving at least two consecutive good seal signals.

11. An apparatus for sealing and monitoring the integrity of a seal in packaging film when forming a bag in a form, fill and seal packaging machine, comprising:

sealing jaws adapted for forming said seal by movement between closed and opened positions;

means for selectively moving said sealing jaws in a first direction toward the closed position for sealing, and in a second direction toward the open position upon completion of the seal;

a sensor operatively coupled to said sealing jaws for sensing the relative position during forming of the seal;

said sensor being effective to determine the presence or absence of product charge matter in said seal;

a processor to generate a signal indicative of the integrity of the seal dependent upon the product charge matter in the seal area; and a controller for providing adaptive control of the packaging machine in response to the input signal representative of the relative seal integrity.

12. The apparatus for sealing and monitoring the integrity of a seal according to claim 11, wherein said sensor is operative to sense the pressure between said sealing jaws.

13. The apparatus for sealing and monitoring the integrity of a seal according to claim 12, wherein said means for moving said sealing jaws is a servo motor, and said sensor is a torque transducer connected to said motor.

14. A method for sealing and monitoring the integrity of a seal in a tube of packaging film during forming of a bag of substantially loose, free flowing product by opposed sealing jaws in a packaging operation, comprising the steps of:

moving said tube along a longitudinal path;

feeding the product into the tube along a parallel path relative to said tube;

moving said sealing jaws in a first direction toward the closed position for sealing, and moving said sealing jaws in a second direction toward the open position upon completion of the seal;

monitoring the pressure being exerted between said sealing jaws upon reaching the closed position;

analyzing said pressure to evaluate the presence or absence of product in said seal so as to affect seal integrity; and adjusting the relative product charge flow with respect to movement of said tube in accordance with the determination of product in said seal, whereby the packaging speed and efficiency can be maximized independent of ambient conditions and product variations.

15. A method for sealing and monitoring the integrity of a seal in a tube of packaging film during formation of a bag with a charge of substantially loose, free flowing product by opposed sealing jaws in a packaging operation, comprising the steps of:

moving said film along a longitudinal path;

introducing and feeding the product charge along a defined flow path;

sensing the presence of the charge at a first time point representing a selected location along said path;

comparing the sensed charge presence to a defined time target;

adjusting at least one operating step of the packaging operation in accordance with any deviation found during the comparing step to cause the charges to approach the time target;

sealing of said tube to form said bag;

determining the integrity of the seal formed during the sealing step based on the presence or absence of matter from said charge in the seal; and modifying said adjusting step upon determination of charge matter in said seal, whereby through adaptive control of the relative product charge flow with respect to the movement of said tube and the determination of the integrity of said seal, the packaging operation including the speed and efficiency of the transitional product flow and the product feeding can be maximized.

* * * * *